United States Patent
Kurian et al.

(10) Patent No.: US 12,321,465 B2
(45) Date of Patent: Jun. 3, 2025

(54) SYSTEM FOR GENERATING AN AUTHENTICATION CREDENTIAL USING NON-FUNGIBLE TOKENS

(71) Applicant: BANK OF AMERICA CORPORATION, Charlotte, NC (US)

(72) Inventors: Manu Jacob Kurian, Dallas, TX (US); Michael Robert Young, Davidson, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 497 days.

(21) Appl. No.: 17/516,193

(22) Filed: Nov. 1, 2021

(65) Prior Publication Data

US 2023/0138797 A1 May 4, 2023

(51) Int. Cl.
| | |
|---|---|
| *G06F 16/27* | (2019.01) |
| *G06F 21/60* | (2013.01) |
| *H04L 9/32* | (2006.01) |
| *H04L 9/00* | (2022.01) |

(52) U.S. Cl.
CPC ............ *G06F 21/602* (2013.01); *G06F 16/27* (2019.01); *H04L 9/3213* (2013.01); *H04L 9/3239* (2013.01); *H04L 9/50* (2022.05)

(58) Field of Classification Search
CPC ........ G06F 21/602; G06F 16/27; G06F 21/31; G06F 21/64; H04L 9/3213; H04L 9/3239; H04L 9/50; H04L 9/0891
See application file for complete search history.

(56) References Cited

U.S. PATENT DOCUMENTS

| | | |
|---|---|---|
| 2009/0287837 A1 | 11/2009 | Felsher |
| 2010/0235285 A1 | 9/2010 | Hoffberg |
| 2016/0321654 A1 | 11/2016 | Lesavich et al. |
| 2017/0048235 A1 | 2/2017 | Lohe et al. |
| 2017/0083907 A1 | 3/2017 | Mcdonough et al. |
| 2017/0148016 A1 | 5/2017 | Davis |
| 2017/0236143 A1 | 8/2017 | Code et al. |
| 2018/0198617 A1 | 7/2018 | Drouin et al. |
| 2018/0268401 A1 | 9/2018 | Ortiz et al. |
| 2019/0180308 A1 | 6/2019 | Ziedan et al. |
| 2019/0295050 A1 | 9/2019 | Chalkias |
| 2019/0299105 A1 | 10/2019 | Knight et al. |
| 2019/0318425 A1 | 10/2019 | Tilley et al. |

(Continued)

*Primary Examiner* — Shin-Hon (Eric) Chen
*Assistant Examiner* — Vladimir I Gavrilenko
(74) *Attorney, Agent, or Firm* — Moore & Van Allen PLLC; Anup Iyer

(57) ABSTRACT

A system for generating an identity-based Non-Fungible Token (NFT) that uses, as a least a portion of the input file, a verified identity of the user. Once generated, the identity-based NFT is stored within a distributed trust computing network, which provides for verifying the authenticity and unalerted state of the NFT. Subsequently, the identity-based NFT can be accessed via the distributed trust computing network to verify the identity of the user. Additionally, the NFT may use other verified data as a portion of the input file, such as verified identity of users having a familial relationship with the user, verified life events, and/or verified user preferences. Further, the NFT may include one or more markers that identify a familial relationship and are configured to link the NFT to other NFTs associated with the related users.

15 Claims, 5 Drawing Sheets

(56) References Cited

U.S. PATENT DOCUMENTS

| | | |
|---|---|---|
| 2019/0340013 A1 | 11/2019 | Cella |
| 2019/0366475 A1 | 12/2019 | Scarselli et al. |
| 2020/0242105 A1 | 7/2020 | Rich et al. |
| 2021/0097508 A1 | 4/2021 | Papanikolas |
| 2022/0044334 A1* | 2/2022 | Blaikie, III ............ G06F 40/186 |
| 2023/0034169 A1* | 2/2023 | Ferenczi ................ H04L 9/0861 |
| 2023/0055835 A1* | 2/2023 | Pacella ................. H04L 9/3213 |
| 2023/0139878 A1* | 5/2023 | Clark .................... H04L 9/3297 |
| | | 713/157 |

* cited by examiner

SYSTEM FOR GENERATING AN AUTHENTICATION CREDENTIAL USING NON-FUNGIBLE TOKENS

FIELD OF THE INVENTION

The present invention is generally related to computing security and, more specifically, generating an identity-based Non-Fungible Token (NFT) as authentication credentials.

BACKGROUND

A Non-Fungible Token (NFT) is a unique and non-interchangeable unit of data that is stored on a distributed ledger. Generally, NFTs have heretofore been used to represent easily-reproducible items, such as photographs, videos, music/audio and other types of digital files that are unique. A distributed trust computing network, such as blockchain technology or the like, is used to establish authenticity of the NFT, proof of ownership and ensure that the NFT is unaltered.

Electronic/online user authentication is typically a daunting task, in that, wrongdoers have numerous means whereby they are able to procure user-specific information typically used for authentication (i.e., user IDs, passcodes, account numbers and the like) and use the information in attempt to falsify their identity (e.g., wrongfully gain access to data associated with others and/or accounts held by others).

Therefore, a need exists to develop other systems, methods and like that add a heightened level of security to user authentication methodology. In this regard, the desired systems and methods should not only establish verification of the user's identity but also provide for a secure means by which the established verification (i.e., authentication credentials) can be accessed and used by the rightful possessor (i.e., the user) to ensure that the credentials are not compromised.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention provide for systems, methods, computer program product and/or the like that, in response to verifying the identity of a user, generate an identity-based Non-Fungible Token (NFT) that uses, as a least a portion of the input file, the verified identity of the user. Once generated, the identity-based NFT is stored within a distributed trust computing network, which provides for verifying the authenticity and unalerted state of the NFT. Subsequently, the identity-based NFT can be accessed via the distributed trust computing network to verify the identity of the user.

In specific embodiments of the invention, the identity-based NFT includes one or more markers, such that, each marker identifies a familial relationship with a second user and is configured to link the identity-based NFT to another identity-based NFT associated with the respective second user that is also stored within the distributed trust computing network. In such embodiments of the invention, the NFT not only provides the user with authentication credentials but also provides for the user's verified lineage.

In still further specific embodiments of the invention, the identity-based NFT is based on further verified information, such as second-user identity verification (i.e., users having a familial relationship with the user), life event verification and/or user preference verification. Such that the NFT is generated using, as a least a portion of the input file, the verified identity of the user, and, at least one of, the verified identity(s) of the second users, the verified life events and the verified user preferences. In such embodiments of the invention, monitoring may be implemented to detect changes in second users (i.e., addition or subtraction of second users), new life events and/or changes in user preferences, and, in response to detecting changes, an updated identity-based NFT is created that replaces the existing identity based NFT.

Moreover, in additional embodiments of the invention, online accounts associated with the user are identified and, in response, the identity-based NFT is linked to the online accounts, such that subsequent authentication requests by the user at the online platform may invoke usage of the NFT for authentication purposes.

A system for generating Non-Fungible Token (NFT)-based authentication credentials defines first embodiments of the invention. The system includes at least one distributed trust computing network that includes a plurality of decentralized nodes. Each decentralized node having a first memory and at least one first processing device in communication with the first memory. The first memory of the decentralized nodes is configured to store at least one distributed ledger that includes a plurality of blocks that store data. The distributed trust computing network is configured to certify that the data stored in the blocks is authentic and unaltered.

The system additionally includes a computing platform in communication with the distributed trust computing network and including a second memory and at least one second processing device in communication with the second memory. The second memory stores a sub-system for generating authentication credentials. The sub-system includes an identity verification module that includes first instructions that are executable by the at least one second processing device and configured to receive data that identifies a user and verify an identity of the user based on the data. The sub-system additionally includes a tokenization module that includes second instructions that are executable by the at least one second processing device and configured to generate an identity-based Non-Fungible Token (NFT) that uses, as at least a portion of an input file, the verified identity of the user, and store the identity-based NFT as a block within a distributed ledger from amongst the at least one distributed ledger.

In specific embodiments of the system, the tokenization module is further configured to generate the identity-based NFT that includes one or more markers. Each marker identifies a familial relationship with a second user and is configured to link the identity-based NFT to another identity-based NFT that is (i) associated with the respective second user and (ii) stored as another block within the distributed ledger.

In other specific embodiments of the system, the identity verification module is further configured to receive second data that identifies one or more second users that have a familial relationship with the user, and verify an identity of the one or more second users based on the second data. In such embodiments of the system, the tokenization module is further configured to generate the identity-based NFT that uses, as at least a portion of the input file, (i) the verified identity of the user, and (ii) the verified identities of the one or more second users.

In related embodiments of the system, the sub-system further includes a familial status change monitoring module including fourth instructions that are executable by the at least one second processing device and configured to monitor for changes in familial relationships of the user including an addition of a new second user or a deletion of an obsolete second user. In such embodiments of the system, the identity verification module is further configured to, in response to receiving indication from the familial status change monitoring module of the addition of the new second user, receive third data that identifies the new second user, and verify the identity of the new second user based on the third data. In such embodiments of the system, the tokenization module is further configured to generate an updated identity-based NFT that replaces the identity-based NFT. The updated identity-based NFT is generated based on using, as at least a portion of an input file, (i) the verified identity of the user, and (ii) the verified identities of the one or more second users including the new second user. In alternate related embodiments of the system, in response to receiving indication from the familial status change monitoring module of the deletion of the obsolete second user, the tokenization module is configured to generate an updated identity-based NFT that replaces the identity-based NFT. The updated identity-based NFT is generated based on using, as at least a portion of the input file, (i) the verified identity of the user and (ii) the verified identities of the one or more second users excluding the obsolete second user.

In further specific embodiments of the system, the sub-system further includes a life event verification module including fourth instructions that are executable by the at least one second processing device and configured to receive second data related to one or more life events of the user, and verify an occurrence of the one or more life events. In such embodiments of the system, the tokenization is further configured to generate the identity-based NFT that uses, as at least a portion of the input file, (i) the verified identity of the user, and (ii) the verified life events of the user. In related embodiments of the system, the sub-system further includes a life event monitoring module including fourth instructions that are executable by the at least one second processing device and configured to monitor for life events of the user. In such embodiments of the system, identity verification module is further configured to in response to receiving indication from the life event monitoring module of a new life event, receive third data associated with the life event, and verify an occurrence of the new life event. Further, in such embodiments of the system the tokenization module is further configured to generate an updated identity-based NFT that replaces the identity-based NFT, wherein the updated identity-based NFT is generated based on using, as an input, (i) the verified identity of the user, and (ii) the verified life events including the new life event.

In other specific embodiments of the system, the sub-system further includes a user preference module including fourth instructions that are executable by the at least one second processing device and configured to receive second data related to one or more user preferences of the user and verify the one or more user preferences. In such embodiments of the system, the tokenization is further configured to generate the identity-based NFT that uses, as at least a portion of the input file, (i) the verified identity of the user, and (ii) verified life events of the user.

In still further specific embodiments of the system, the sub-system for generating authentication credentials further includes an authentication credential application module including third instructions that are executable by the at least one second processing device and configured to identify one or more online accounts associated with the user, and link the NFT to the one or more online accounts to allow for the NFT to be accessed and used as authentication credentials for performing transactions using the one or more or online accounts.

Moreover, in additional embodiments of system, the identity verification module is further configured to verify the identity of the user based on the data by implementing the at least one distributed trust computing network. The plurality of blocks store the data and the decentralized nodes of the distributed trust computing network converge on the plurality of blocks to certify the authenticity of the data.

A computer-implemented method for generating Non-Fungible Token (NFT)-based authentication credentials defines second embodiments of the invention. The computer-implemented method is executed by one or more computer processing devices. The method includes receiving data that identifies a user, verifying an identity of the user based on the data, generating an identity-based Non-Fungible Token (NFT) that uses, as at least a portion of an input file, the verified identity of the user, and storing the identity-based NFT as a block within a distributed ledger stored by decentralized nodes of a distributed trust computing network.

In specific embodiments of the computer-implemented method, generating the identity-based NFT further includes generating the identity-based NFT that includes one or more markers. Each marker identifies a familial relationship with a respective second user and is configured to link the identity-based NFT to another identity-based NFT associated with the second user and stored as another block within the distributed ledger.

In other specific embodiments, the computer-implemented method further includes receiving second data that identifies one or more second users that have a familial relationship with the user and verifying an identity of the one or more second users based on the second data. In such embodiments of the method, generating the identity-based NFT further includes generating the identity-based NFT that uses, as at least a portion of the input file, (i) the verified identity of the user, and (ii) the verified identities of the one or more second users.

In still other specific embodiments, the computer-implemented method includes receiving second data related to one or more life events of the user and verifying an occurrence of the one or more life events. In such embodiments of the method, generating the identity-based NFT further includes generating the identity-based NFT that uses, as at least a portion of the input file, (i) the verified identity of the user, and (ii) the verified life events of the user.

In additional specific embodiments, the computer-implemented method includes identifying one or more online accounts associated with the user, and linking the NFT to the one or more online accounts to allow for the NFT to be accessed and used as authentication credentials for performing transactions using the one or more or online accounts.

A computer program product including a non-transitory computer-readable medium defines third embodiments of the invention. The computer-readable medium includes a first set of codes for causing a computer to receive data that identifies a user and a second set of codes for causing a computer to verify an identity of the user based on the data. Additionally, the computer-readable medium includes a third set of codes for causing a computer to generate an identity-based Non-Fungible Token (NFT) that uses, as at least a portion of an input file, the verified identity of the user, and a fourth set of codes for causing a computer to store the identity-based NFT as a block within a distributed ledger stored by decentralized nodes of a distributed trust computing network.

In specific embodiments of the computer program product, the third set of codes are further configured to cause the computer to generate the identity-based NFT that includes one or more markers. Each marker identifies a familial relationship with a respective second user and is configured to link the identity-based NFT to another identity-based NFT associated with the second user and stored as another block within the distributed ledger.

In other specific embodiments of the computer program product, the computer-readable medium further includes a fifth set of codes for causing a computer to receive second data that identifies one or more second users that have a familial relationship with the user; and a sixth set of codes for causing a computer to verify an identity of the one or more second users based on the second data. In such embodiments of the computer program product, the third set of codes are further configured to generate the identity-based NFT that uses, as at least a portion of the input file, (i) the verified identity of the user, and (ii) the verified identities of the one or more second users.

In other specific embodiments of the computer program product, the computer-readable medium further includes a fifth set of codes for causing a computer to receive second data related to one or more life events of the user, and a sixth set of codes for causing a computer to verify an occurrence of the one or more life events. In such embodiments of the computer program product, the third set of codes are further configured to cause the computer to generate the identity-based NFT identity-based NFT that uses, as at least a portion of the input file, (i) the verified identity of the user, and (ii) the verified life events of the user.

Moreover, in additional specific embodiments of the computer program product, the computer-readable medium further includes a fifth set of codes for causing a computer to identify one or more online accounts associated with the user, and a sixth set of codes for causing a computer to link the NFT to the one or more online accounts to allow for the NFT to be accessed and used as authentication credentials for performing transactions using the one or more or online accounts.

Thus, according to embodiments of the invention, which will be discussed in greater detail below, the present invention provides for generating an identity-based Non-Fungible Token (NFT) that uses, as a least a portion of the input file, a verified identity of the user. Once generated, the identity-based NFT is stored within a distributed trust computing network, which provides for verifying the authenticity and unalerted state of the NFT. Subsequently, the identity-based NFT can be accessed via the distributed trust computing network to verify the identity of the user. In specific embodiments of the invention, the identity-based NFT includes one or more markers, such that, each marker identifies a familial relationship with a second user and is configured to link the identity-based NFT to another identity-based NFT associated with the respective second user that is also stored within the distributed trust computing network. In such embodiments of the invention, the NFT not only provides the user with authentication credentials but also provides for the user's verified lineage.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
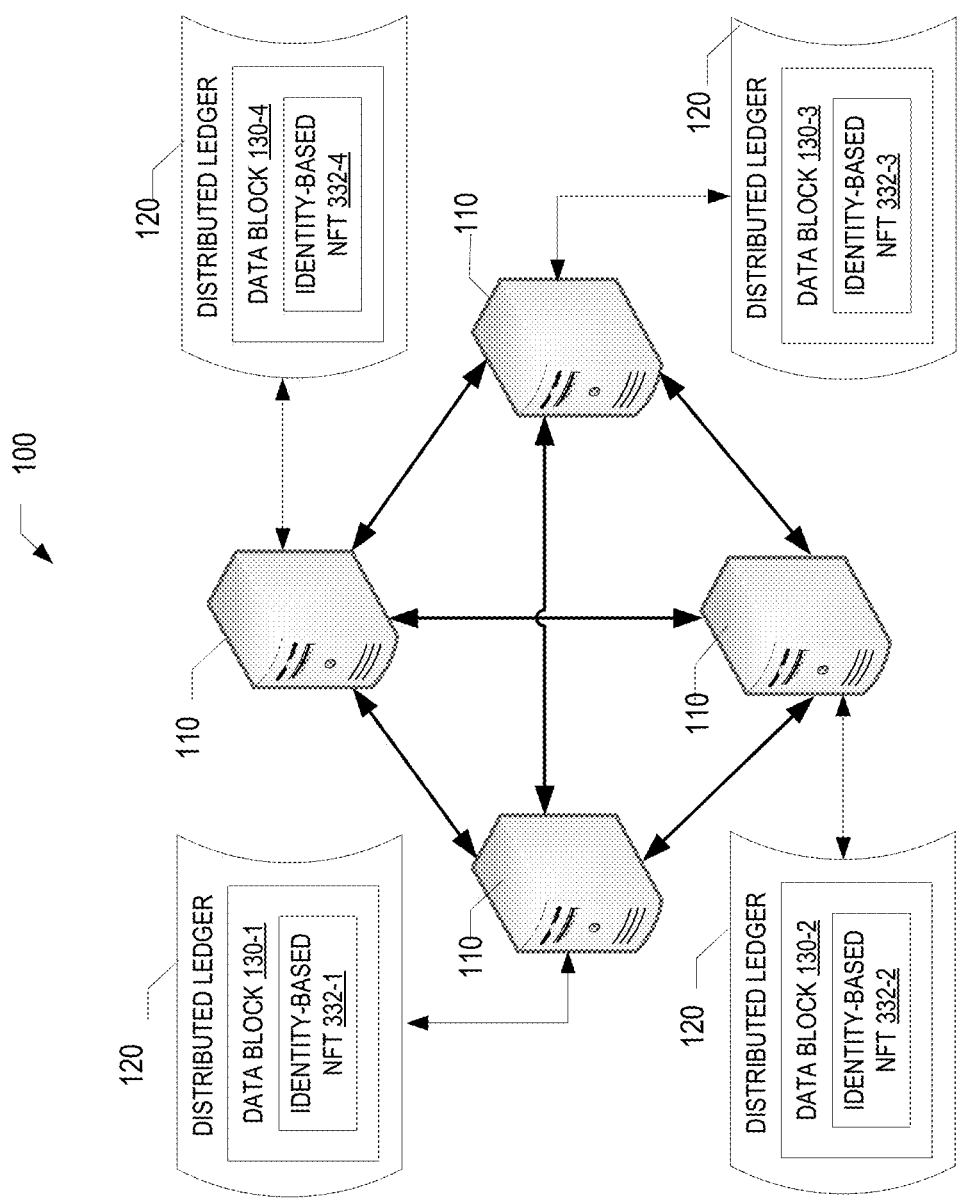
Figure 2:
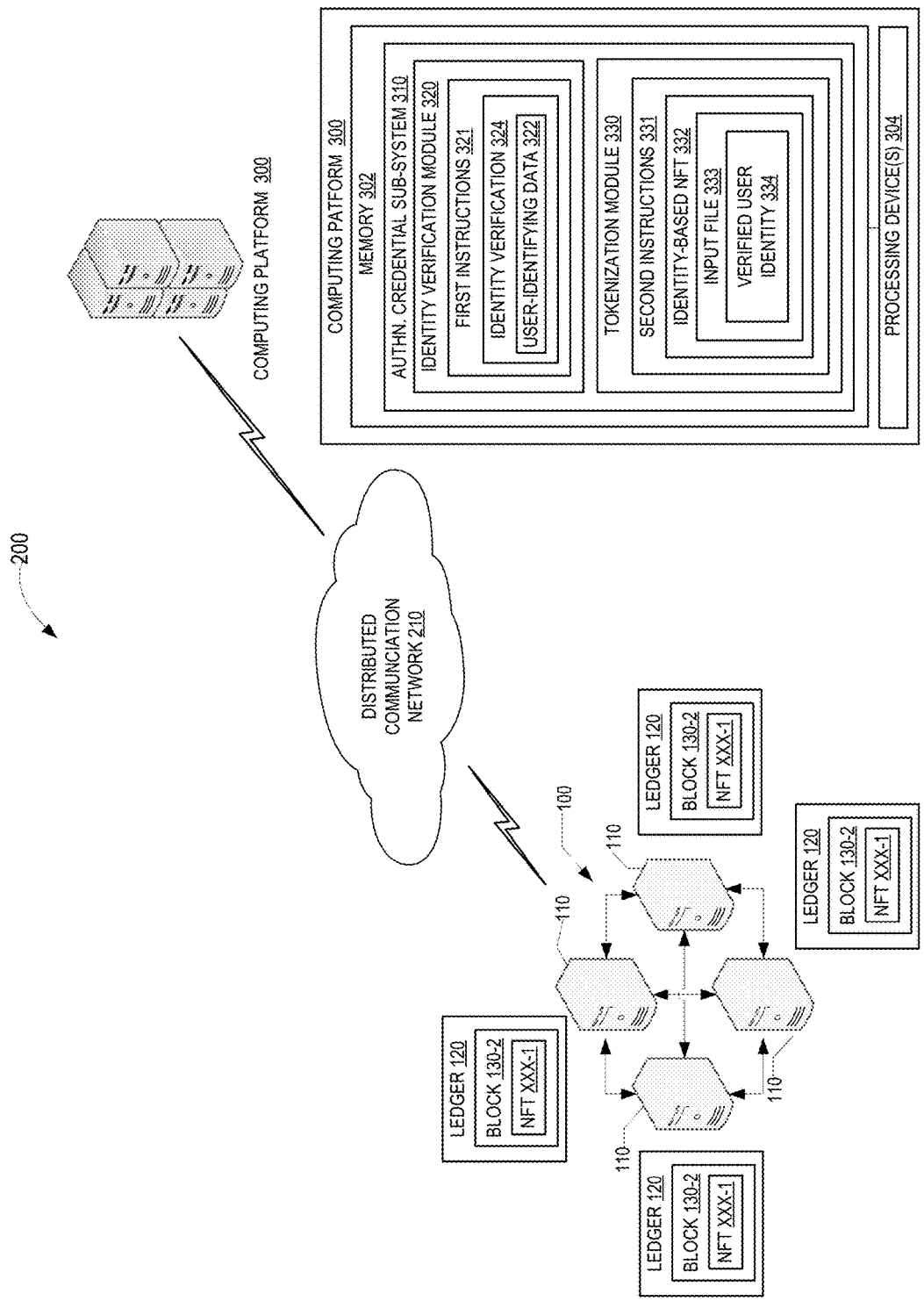
Figure 3:
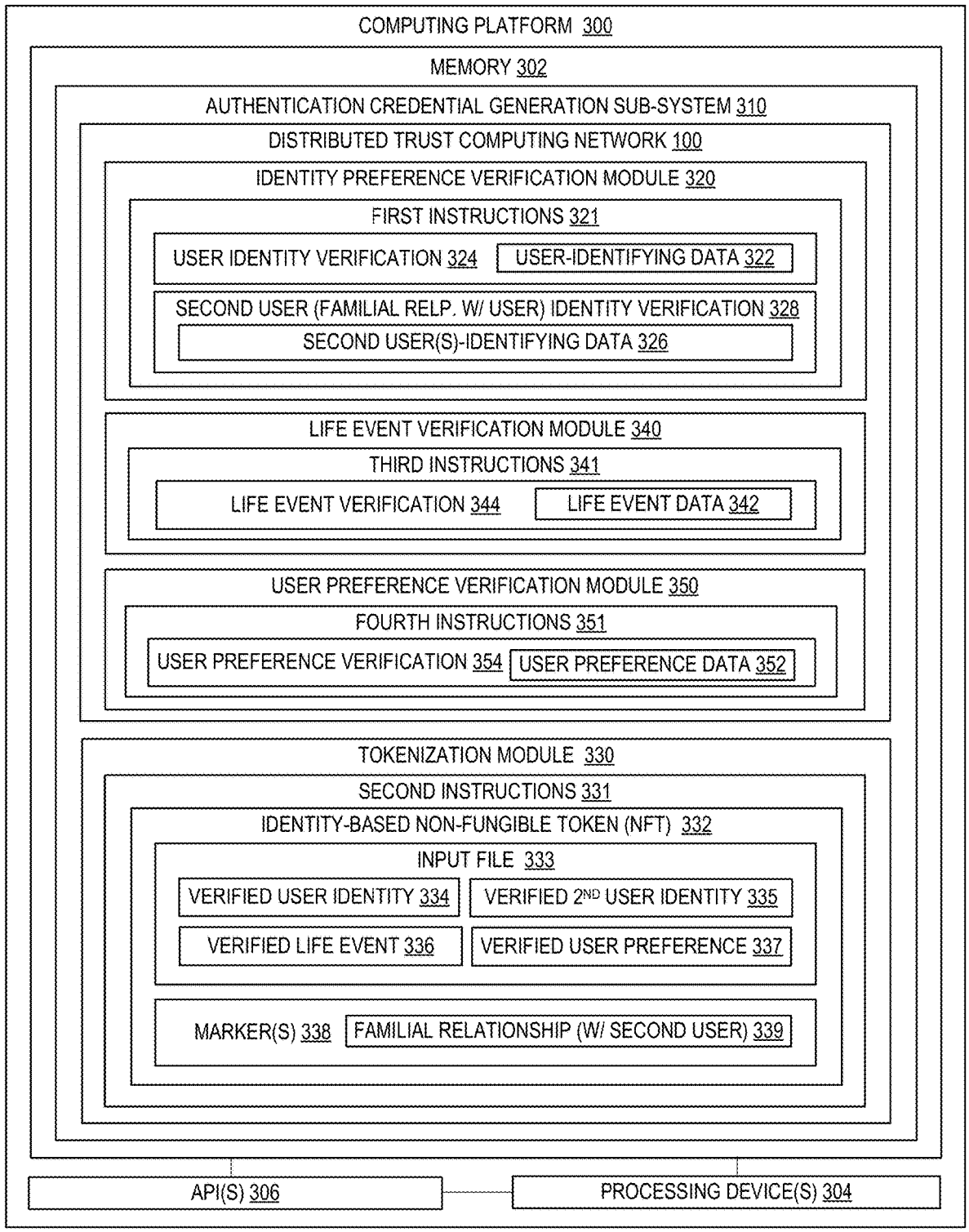
Figure 4:
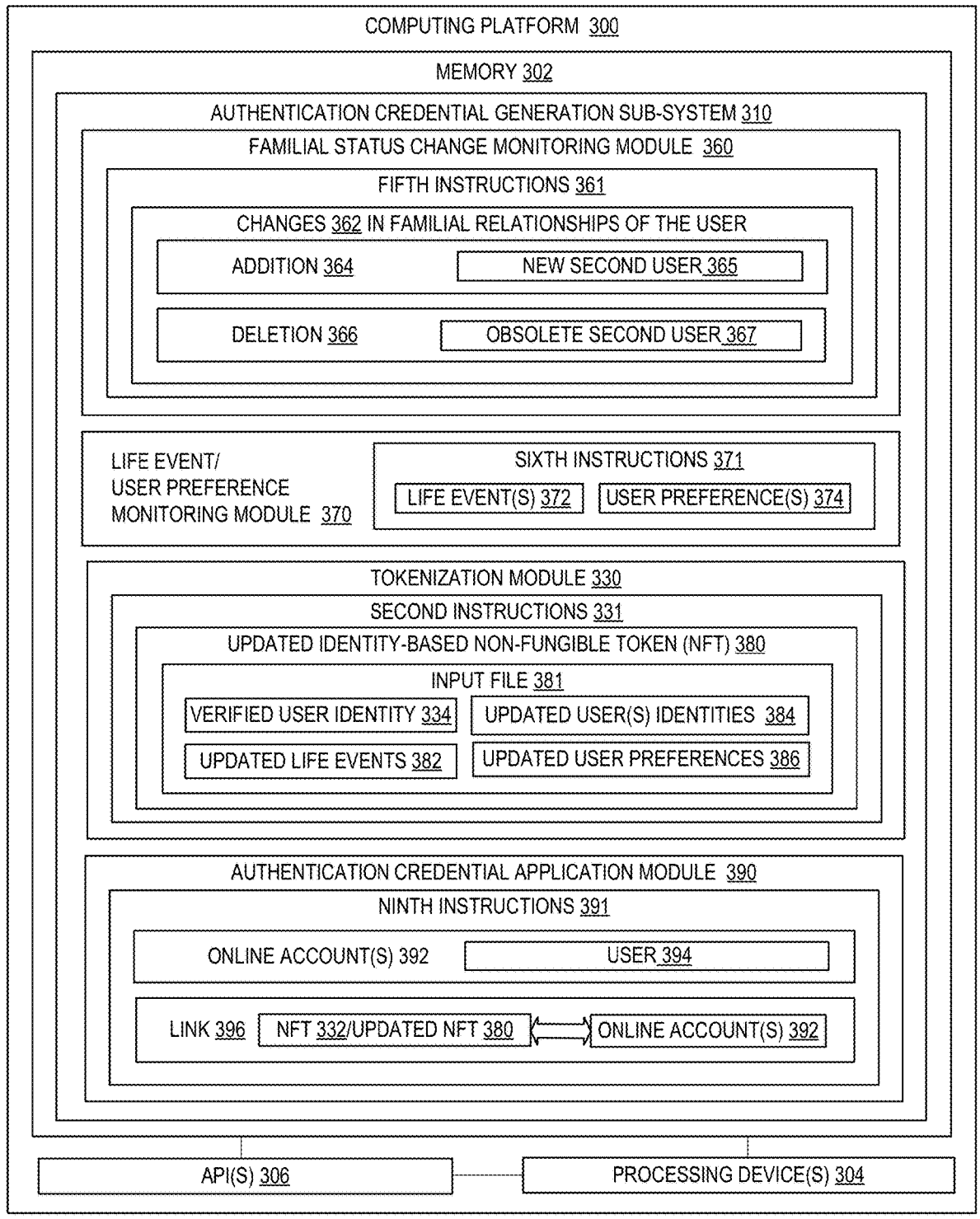
Figure 5:
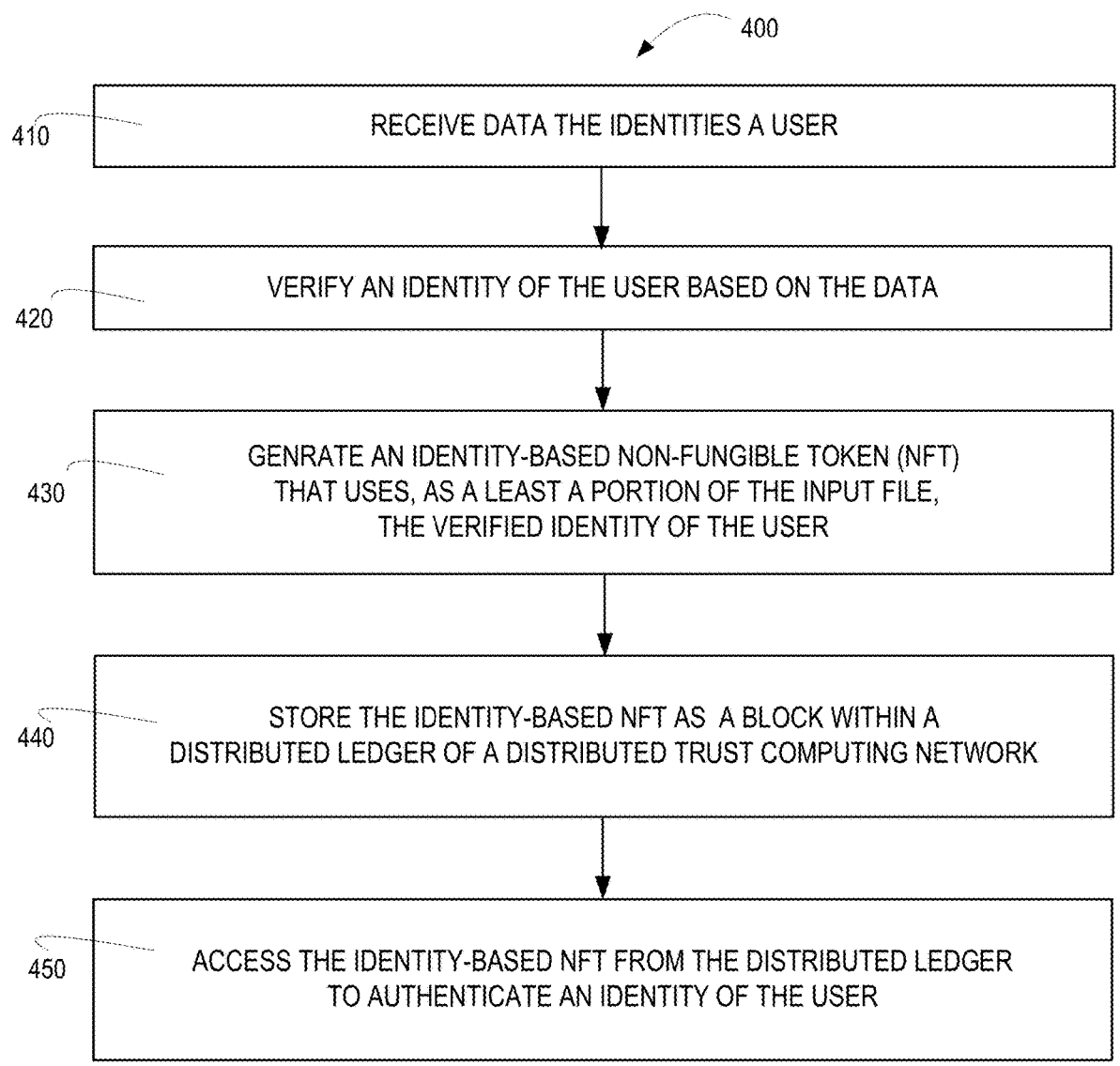

Having thus described embodiments of the disclosure in general terms, reference will now be made to the accompanying drawings, wherein:

FIG. 1 is a schematic diagram of a distributed trust computing network, in accordance with embodiments of the present invention;

FIG. 2 is a schematic diagram illustrating a system for generating and storing an identity-based Non-Fungible Token (NFT) as authentication credentials, in accordance with embodiment of the present invention;

FIGS. 3 and 4 are block diagrams of a computing platform an authentication credential generation sub-system for generating an identity-based NFT, in accordance with embodiments of the present invention; and FIG. 5 is flow diagram of a method for generating and applying an identity-based NFT, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processing device of a general purpose computer, special purpose computer, or other programmable data processing apparatus to produce a particular machine, such that the instructions, which execute by the processing device of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processing device may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods, computer program product and/or the like are provided for generating an identity-based Non-Fungible Token (NFT) that uses, as a least a portion of the input file, the verified identity of the user. Once generated, the identity-based NFT is stored within a distributed trust computing network, which provides for verifying the authenticity and unalerted state of the NFT. Subsequently, the identity-based NFT can be accessed via the distributed trust computing network to verify the identity of the user. The identity-based NFT may be used as a one-time-only use token for purposes of authentication or may configured for multiple uses. In other embodiments of the invention the identity-based NFT may serve as an electronic signation, in which the input file includes an image representation of the user's signature.

In specific embodiments of the invention, the identity-based NFT includes one or more markers, such that, each marker identifies a familial relationship with a second user and is configured to link the identity-based NFT to another identity-based NFT associated with the respective second user that is also stored within the distributed trust computing network. In such embodiments of the invention, the NFT not only provides the user with authentication credentials but also provides for the user's verified lineage. In this regard, the NFT may be used in legal proceedings (e.g., trusts, estate settlement and the like), in which a user must verify their familial relationships and the like.

In still further specific embodiments of the invention, the identity-based NFT is based on further verified information, such as second-user identity verification (i.e., users having a familial relationship with the user), life event verification and/or user preference verification. Such that the NFT is generated using, as a least a portion of the input file, the verified identity of the user, and, at least one of, the verified identity(s) of the second users, the verified life events and the verified user preferences. In such embodiments of the invention, monitoring may be implemented to detect changes in second users (i.e., addition or subtraction of second users), new life events and/or changes in user preferences, and, in response to detecting changes, an updated identity-based NFT is created that replaces the existing identity-based NFT.

Moreover, in additional embodiments of the invention, online accounts associated with the user are identified and, in response, the identity-based NFT is linked to the online accounts, such that subsequent authentication requests by the user at the online platform may invoke usage of the NFT for authentication purposes.

Turning now to the figures, FIG. 1 is a schematic diagram of an exemplary distributed trust computing network 100 otherwise referred to herein as a blockchain network or "block chain", in accordance with embodiments of the present invention. The distributed trust computing network 100 includes a distributed database that maintains, e.g., a list of data records, or the like. The security of the data maintained within the trust network 100 is enhanced by the distributed nature of the network/block chain. The distributed trust computing network 100 is configured to verify the authenticity/validity of data and insure that the data stored thereon is unaltered The distributed trust computing network 100 typically includes several nodes 110, which may be one or more systems, machines, computers, databases, data stores or the like operably connected with one another. In some instances, each of the nodes 110 or multiple nodes 110 are maintained by different entities. A distributed trust computing network 100 typically works without a central repository or single administrator. One well-known application of a distributed trust computing network/block chain is the public ledger of transactions for cryptocurrencies such as used in bitcoin. The data records recorded in the distributed trust computing network 100 are enforced cryptographically and stored on the nodes 100 of the block chain.

A distributed trust computing network 100 provides numerous advantages over traditional storage networks/databases. A predetermined number of number of nodes 110 of a trust network may reach a consensus regarding the validity of data maintained within a block 130 of the blockchain. Additionally, when multiple versions of a data record exist on the ledger 120, multiple nodes 110 can converge on the most up-to-date version of the data record, such that the most-up-to-date version of the data record is the only version that is deemed validated. For example, any node 110 within the distributed trust computing network 100 that stores a data record can determine within a level of certainty whether the data record can be authenticated/authorized to take place and become final by confirming that no conflicting data records are confirmed by the distributed trust computing network 100 elsewhere.

The distributed ledger 120 typically has two primary types of data records. The first type is the record type, which consists of the actual data stored in a block 130 within a distributed ledger 120. For example, in the present invention the actual data is an identity-based NFT 332. The second type is the block type, which are records that confirm when and in what sequence certain events became recorded as part of the distributed ledger 120. Data records and the events associated therewith are created by participants using the distributed trust computing network 100 in its normal course of business, for example, when data record is received, a data block(s) 130 is created by individuals known as "miners" who use specialized software/equipment to create data blocks 130. Holders of a data block 130 of the distributed trust computing network 100 agree to store a record within the distributed trust computing network 100 and the related records are passed around to various nodes 110 of the distributed trust computing network 100. A "valid" record or related event is one that can be validated based on a set of rules that are defined by the particular system implementing the distributed trust computing network 100.

A distributed trust computing network/block chain 100 is decentralized—meaning that a distributed ledger 120 (i.e., a decentralized ledger) is maintained on multiple nodes 110 of the trust network/block chain 100. One node 110 in the distributed trust computing network 100 may have a complete or partial copy of the entire distributed ledger 120 or set of records and/or data blocks 130 on the distributed trust computing network 100. Events are initiated at a node 110 of a distributed trust computing network 100 and communicated to the various nodes 110 of the distributed trust computing network 100. Any of the nodes 110 can validate a record or an associated event, add the record or the details of the storage event to its copy of the distributed ledger 120, and/or broadcast the record or details of the storage event, its associated validation (in the form of a data block 130) and/or other data to other nodes 110. The distributed trust computing network 100 shown in FIG. 1 is configured to perform one or more of the steps or functions performed by the system shown in FIG. 2, the computing platform shown in FIGS. 3 and 4 and the methods described by relation to FIG. 5.

Referring to FIG. 2 a schematic diagram is system 200 for generating identity-based Non-Fungible Tokens (NFTs) that serve as authentication credentials, in accordance with embodiments of the present invention. The system 200 is implemented across a distributed communication network 210 that may include the Internet, one or more intranets, one or more cellular networks or the like. The system includes a distributed trust computing network 100, such as a blockchain network comprising a plurality of decentralized nodes 110 each having a first memory (not shown in FIG. 2) and at least on first processing device (not shown in FIG. 2) in communication with the first memory. The first memory of the decentralized nodes 110 is configured to store at least one distributed ledger 120 that comprises a plurality of data blocks 130-1-130-4. The distributed trust computing network is configured to certify/validate that the data stored in data blocks 130-1-130-4 is authentic and unaltered.

The system additionally includes computing platform 300 which includes second memory 302 and at least one second processing device 304 in communication with second memory 302. Second memory 302 stores authentication credentials generator sub-system 310 that is executable by the least one second processing device 304. Sub-system 310 includes an identity verification module 320 that includes first instructions 321 that are executable by the at least one second processing devices 304 and are configured to receive user-identifying data 322 that identifies a user. The term "user" as used herein may refer to a single individual or entity/group comprising more than one individual. The user-identifying data 322 may be received from the user requiring identity verification or the data may be mined from various data sources. Further, first instructions 321 are configured to perform identity verification 324 to verify the identity of the user based at least on the user-identifying data 322. In specific embodiments of the invention, distributed trust computing network 100 (or another distributed trust computing network not shown in FIG. 2) may be implemented as the means by which identity verification module 320 verifies the identity of the user. In such embodiments of the invention, identity verification may be performed by a plurality of nodes 110 within the distributed trust network 100 may reach a consensus as to the identity of the user (i.e., based on submission of the user-identifying data 322) and record such within a data block 130 of a distributed ledger 120.

Authentication credentials generator sub-system 310 additionally includes tokenization module 330 that includes second instructions 331 that are executable by the at least one second processing device 304 and are configured to generate an identity-based NFT 332 that uses, as at least a portion of the input file 333, the verified user identity 334. The input file 333 may additional comprises conventional NFT subject matter, such as an image, a video, audio, multimedia or the like. Once generated, the second instructions 331 are further configured to store the identity-based NFT 332 as data block 130 within a distributed ledger 130 of the distributed trust computing network 100. The identity-based NFT 332 is subsequently accessible from the distributed trust computing network 100 to provide for authenticating the identity of the user. In specific embodiments of the invention, the identity-based NFT 332 may be generated as a one-time-only (i.e., single-use) authentication mechanism, while in other embodiments of the invention, the identity-based NFT 332 may be configured for multiple (i.e., a predetermined number or unlimited) authentication verifications. In other embodiments of the invention, the identity-based NFT may serve as the user's digital signature.

Referring to FIGS. 3 and 4 block diagrams are presented of the computing platform 300, in accordance with embodiments of the present invention. The computing platform 300 may comprise one or more computing devices (e.g., servers, computing devices, or the like), and is configured to execute algorithms, modules, routines, applications, such as authentication credential generation sub-system 310. Computing platform 300 includes memory 302, which may comprise volatile and non-volatile memory, such as read-only and/or random-access memory (RAM and ROM), EPROM, EEPROM, flash cards, or any memory common to computing platforms). Moreover, memory 302 may comprise cloud storage, such as provided by a cloud storage service and/or a cloud connection service.

Further, computing platform 300 also includes at least one processing device 304, which may be an application-specific integrated circuit ("ASIC"), or other chipset, logic circuit, or other data processing device. Processing device(s) 304 may execute one or more application programming interface (APIs) 306 that interface with any resident programs, such as authentication credential generation sub-system 310 or the like, stored in the memory 302 of the computing platform 300 and any external programs. Processing devices(s) 304 may include various processing subsystems (not shown in FIGS. 3 and 4) embodied in hardware, firmware, software, and combinations thereof, that enable the functionality of the computing platform 300 and the operability of the computing platform 300 on the distributed communication network 210 (shown in FIG. 2). For example, processing subsystems allow for initiating and maintaining communications and exchanging data with other networked devices, such as distributed trust computing network 100. For the disclosed aspects, processing subsystems of processing device 304 may include any processing subsystem used in conjunction with authentication credential generation sub-system 310 and related tools, routines, modules, sub-routines, algorithms, sub-algorithms, sub-modules thereof.

Computing platform 300 may additionally include a communications module (not shown in FIGS. 3 and 4) embodied in hardware, firmware, software, and combinations thereof, that enables electronic communications between the computing platform 300 and other network devices, such as distributed trust computing network 100 (shown in FIG. 2). Thus, communication module may include the requisite hardware, firmware, software and/or combinations thereof for establishing and maintaining a network communication connection with one or more network devices.

Memory 302 of computing platform 300 stores authentication credential generation sub-system 310 that is configured to generate identity-based Non-Fungible Token (NFTs) 332 that serve as authentication credentials for the associated user, in accordance with embodiments of the present invention. In specific embodiments of the invention, the authentication credential generation sub-system 310 includes identity/event/user preference verification modules 320, 340, 350, while in other embodiments of the invention the identity/event/preference verification modules 320, 340, 350 may be a separate modules or sub-systems external to the authentication credential generation sub-system 310.

The identity verification module 324 includes first instructions 321 that are executable by the at least one second processing device 304 and configured to receive user-identifying data 322 that identifies a user. As previously discussed, the user-identifying data 322 may be received from the user requiring identity verification or the data may be mined from various data sources. Further, first instructions 321 are configured to perform user identity verification 324 to verify the identity of the user based at least on the user-identifying data 322. In specific embodiments of the invention, in which the identity-based NFT 331 is also configured to provide lineage authentication (i.e., verified descendants of the user), first instructions 321 are further configured to receive second user-identifying data 326 that identifies second users, which have a familial relationship with the user (i.e., spouse, children, siblings, parents, relatives or the like). The second user-identifying data 326 may be received from the user or the specific second user requiring identity verification or the data may be mined from various data sources. Further, first instructions 321 are configured to perform second user identity verification 328 to verify the identity of the second user and/or the familial relationship with the user (i.e., the second user is, in fact, related to the user in the purported manner (e.g., spouse, child, sibling, parent or the like)) based at least on the second user-identifying data 326.

In alternate embodiments of the invention, in which the identity-based NFT is additionally life event-based to provide not only identity verification/authentication but also life event verification, life event verification module 340 is presented which includes third instructions 341 that are executable by the at least one second processing device 304 and configured to receive life event data 342. The life event data 342 may be received from the user or the data may be mined from various data sources. Life event may be any life event that has a legal significance, such as births, deaths, adoptions, marriages, divorces, trusts, and the like. Further, third instructions 341 are configured to perform life event verification 328 to verify the occurrence of the life event based at least on the life event data 342.

In alternate embodiments of the invention, in which the identity-based NFT is additionally user preference-based to provide not only identity verification/authentication but also user preference verification, user preference verification module 350 is presented which includes fourth instructions 351 that are executable by the at least one second processing device 304 and configured to receive user preference data 352. The user preference data 352 may be received from the user or the data may be mined from various data sources. User preference data may be any preference that the user has for types products, types services, configuration of the specific preferred types of products and/or services or the like, such that the users preferences may be used to customize a user's online experience at an online retailer requiring user authentication and the like. Further, fourth instructions 352 are configured to perform user preference verification 354 to verify that the preferences are the preferences of the user based at least on the user preference data 332.

In specific embodiments of the invention, a distributed trust computing network, such as, distributed trust computing network 100 (shown in FIG. 2) or another distributed trust computing network may be implemented as the means by which identity verification module 320 verifies the identity of the user or second user(s), life even module 340 verifies the occurrence of a life event and/or user preference verification module 350 verifies user preferences. In such embodiments of the invention, identity, life event and/or user preference verification may be performed by a plurality of nodes within the distributed trust network reaching a consensus as to the identity of the user or second user(s), the occurrence of the life and/or the user preference and record such within a data block of a distributed ledger.

Authentication credential generation sub-system 310 includes tokenization module 330 that includes second instructions 331 that are executable by the at least one second processing device 304 and are configured to generate an identity-based NFT 332 that uses, as at least a portion of the input file 333, the verified user identity 334. In additional embodiments of the invention, the input file 333 may additionally include the verified second user identity(s) 335, the verified life events 336 and/or the verified user preferences 337. In such embodiments of the invention, the NFT 332 may not only be user identity-based but may be further based on at least one of second user-identities, the user's life events and/or user preferences. As previously discussed, the input file 333 may additional comprises conventional NFT subject matter, such as an image, a video, audio, multimedia or the like.

In alternate embodiments of the invention, the identity-based NFT may include markers 338. Each marker 338 identifies a familial relationship with a second user and is configured to link the identity-based NFT to another identity-based NFT that is associated with the respective second user and is also stored as a block 130 (i.e., verified as authentic) within the distributed ledger 120.

Once the identity-based NFT 332 has been generated, the second instructions 331 are further configured to store the identity-based NFT 332 as data block 130 within a distributed ledger 130 of the distributed trust computing network 100. The identity-based NFT 332 is subsequently accessible from the distributed trust computing network 100 to provide for authenticating the identity of the user. In specific embodiments of the invention, the identity-based NFT 332 may be generated as a one-time-only (i.e., single-use) authentication mechanism, while in other embodiments of the invention, the identity-based NFT 332 may be configured for multiple (i.e., a predetermined number or unlimited) authentication verifications. In other embodiments of the invention, the identity-based NFT may serve as the user's digital signature.

Referring to FIG. 4, the authentication credential generator sub-system 310 may, in specific embodiments of the invention, include familial status change monitoring module 360 and life event/user preference monitoring module 370. In specific embodiments of the invention, the familial status change monitoring module 360 and/or the life event monitoring module 370 are included within the authentication credential generation sub-system 310, while in other embodiments of the invention the familial status change monitoring module and/or life event monitoring module may be a separate modules or sub-systems external to the authentication credential generation sub-system 310.

Familial status change monitoring module 360 includes fifth instructions 361 that are executable by the at least one second processing device 304 and configured to monitor for changes 362 in familial relationships of the user, such as addition 364 of a new second user 365 (i.e., birth, adoption, marriage or the like) or deletion 366 of an obsolete second user 367 (e.g., death, divorce or the like). The monitoring may include monitoring publicly-accessible databases or receiving inputs from the user. In response to receiving indication from the familial status change monitoring module 360 of a change 362 in familial relationship of the user that adds 364 a new second user 365, the identity verification module 320 receives second user-identifying data 326 associated with the new second user 365 and performs second user identity verification 328 based at least on the second user-identifying data 326. In response to verifying the identity of the new second user 365, the second instructions 331 of the tokenization module 330 are further configured to generate an updated identity-based NFT 380 that replaces the existing identity-based NFT. In specific embodiments of the invention, the updated identity-based NFT 380 is generated based on using, as at least a portion of an input file 381, (i) the verified user identity 334, and (ii) the updated verified second users identities 384 including the new second user 365. While in other embodiments of the invention, the updated identity-based NFT 380 may include an additional marker 338 associated with the new second user 365 that is configured to link the updated NFT 380 to another identity-based NFT associated with the new second user 365. In response to receiving indication from the familial change monitoring module 360 of a change 362 in familial relations of the user that deletes 366 an obsolete second user 367, the second instructions 331 of the tokenization module 330 are further configured to generate an updated identity-based NFT 380 that replaces the existing identity-based NFT. In specific embodiments of the invention, the updated identity-based NFT 380 is generated based on using, as at least a portion of an input file 381, (i) the verified user identity 334, and (ii) the updated verified second users identities 384 excluding the obsolete second user 367. While in other embodiments of the invention, the updated identity-based NFT 380 may remove the marker 338 associated with the obsolete second user 367.

Life event/user preference monitoring module 370 includes sixth instructions 371 that are executable by the at least one second processing device 304 and configured to monitor for life events 372 and/or changes in user preferences 374. The monitoring may include monitoring publicly-accessible databases or receiving inputs from the user. In response to receiving indication from the life event/user preference monitoring module 370 of life event 372 or a user preference change 374, the life event verification module 340 or user preference verification module 350 receives life event data 342 or user preference data 352 and performs second life event verification 344 or user preference verification 354 based at least on the life event data 342 or user preference data 352. In response to verifying the life event 372 or the change in user preference 374, the second instructions 331 of the tokenization module 330 are further configured to generate an updated identity-based NFT 380 that replaces the existing identity-based NFT. In specific embodiments of the invention, the updated identity-based NFT 380 is generated based on using, as at least a portion of an input file 381, (i) the verified user identity 334, and (ii) the updated verified life events 382 and/or (iii) the updated verified user preferences 386.

In additional embodiments of the invention, the authentication credential generation sub-system 310 includes authentication credential application module 390, while in other embodiments of the invention, authentication credential application module 390 may exist as a separate module or sub-system external from sub-system 310. Authentication credential application module 390 includes ninth instructions 391 that are executable by the at least one second processor 304 and are configured to identify one or more online accounts 392 associated with or held by the user 394 and, in response, link 396 the NFT 332 (or updated NFT 380) to the one or more online accounts 392. The linking 396 of the NFT 332/380 to the accounts 392 allows for the NFT 332/380 to be accessed and used as authentication credentials for performing resource exchange events (e.g., transactions) using the one or more online accounts. In specific embodiments of the invention, the linking 396 and use of the NFT 332/380 may be one-time only/single use, such that, the linkage 396 is deactivated after a single user or the NFT 332/380 expires after a single use. In other embodiments of the invention, the linkage 396 and use of the NFT 332/380 may be for multiple usages (e.g., a predetermined number or unlimited usages). In other embodiments of the invention, usage of the identity-based NFT as authentication credentials is triggered based on the amount of the transaction being above a predetermined amount threshold.

Referring to FIG. 5 a flow diagram is depicted of a method 400 for generating an identity-based NFT, in accordance with embodiments of the present invention. At Event 410, data is received that identifies a user. The data may be inputted by the user or may be received or harvested from various data sources. In additional embodiments of the method, other data may be received, such as data associated with second users (e.g., users having a familial relationship with the user), life events associated with the user, user preferences or the like.

At Event 420, an identity of the user is verified based at least on the data. In other embodiments of the method, the other data may also be verified, for example, the identities of the second users may be verified based at least on the second user identifying data, the occurrence of the life events may be verified based on the life event data and/or the user preferences may be verified based at least on the user preference data.

At Event 430, an identity-based non-fungible token (NFT) is generated that uses, as at least a portion of the input file, (i) the verified identity of the user and, in other embodiments of the method, (ii) the verified identities of the second users, (iii) the verified life events, and (iv) the verified user preferences. Additionally, in specific embodiments of the method, the generation of the NFT includes adding markers to the NFT that identify a second user/familial relationship and are configured to link the identity-based NFT to another identity-0based NFT associated with the second user/familial relationship. The input file may additional comprise conventional NFT data, such as, image data, audio data, video data, multimedia data or the like.

At Event 440, the identity-based NFT is stored as a data block within a distributed ledger of a distributed trust computing network which means that a plurality of the nodes have reached a consensus of the authenticity of the NFT and an unaltered state of the NFT.

At Event 450, the identity-based NFT is accessed from the distributed ledger of the distributed trust computing network to authenticate the identity of the user. In additional embodiments of the method, the identity-based NFT is linked to online accounts associated with the user to allow for the NFT to be accessed via the distributed trust computing network and acts as authentication credentials for transactions performed in conjunction with the online account.

In additional embodiments of the method, where applicable, the identity-based NFT may be updated (i.e., replaced with a new identity-based token) based on changes in familial relationships (adding new second users (e.g., birth, adoption, marriage and the like) and/or deleting obsolete second users (e.g., death, divorce or the like); addition of life events and/or changes in user preferences. In further specific embodiments of the method, the changes in familial relationships, life events and/or user preferences are monitored for and, in response to detecting/identifying a change in familial relationships, life events and/or user preferences, the changes are verified prior to updating the identity-based NFT.

Thus, present embodiments of the invention provide for generating an identity-based Non-Fungible Token (NFT) that uses, as a least a portion of the input file, a verified identity of the user. Once generated, the identity-based NFT is stored within a distributed trust computing network, which provides for verifying the authenticity and unaltered state of the NFT. Subsequently, the identity-based NFT can be accessed via the distributed trust computing network to verify the identity of the user. In specific embodiments of the invention, the identity-based NFT includes one or more markers, such that, each marker identifies a familial relationship with a second user and is configured to link the identity-based NFT to another identity-based NFT associated with the respective second user that is also stored within the distributed trust computing network. In such embodiments of the invention, the NFT not only provides the user with authentication credentials but also provides for the user's verified lineage The features, functions, and advantages that have been discussed may be achieved independently in various embodiments of the present invention or may be combined with yet other embodiments, further details of which can be seen with reference to the following description and drawings.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating Non-Fungible Token (NFT)-based authentication credentials, the system comprising:

at least one distributed trust computing network comprising a plurality of decentralized nodes, each decentralized node having a first memory and at least one first processing device in communication with the first memory, wherein the first memory of the decentralized nodes is configured to store at least one distributed ledger comprising a plurality of blocks that store data, wherein the distributed trust computing network is configured to certify that the data stored in the blocks is authentic and unaltered; and a computing platform in communication with the distributed trust computing network and including a second memory and at least one second processing device in communication with the second memory, wherein the second memory stores a sub-system for generating authentication credentials and comprises:

an identity verification module including first instructions that are executable by the at least one second processing device and configured to:
receive first data that identifies a user and second data that identifies one or more second users, wherein the one or more second users have a familial relationship with the user, and
verify an identity of (i) the user based on the first data and (ii) the one or more second users based on the second data, a tokenization module including second instructions that are executable by the at least one second processing device and configured to:
generate an identity-based Non-Fungible Token (NFT) that uses, as at least a portion of an input file, (i) the verified identity of the user, and (ii) the verified identities of the one or more second users, and
store the identity-based NFT as a block within a distributed ledger from amongst the at least one distributed ledger, wherein the identity-based NFT is accessible from the distributed ledger for purposes of authenticating (i) an identity of the user and (ii) lineage of the user as defined by the one or more second users, and a familial status change monitoring module including third instructions that are executable by the at least one second processing device and configured to:
monitor for changes in familial relationships of the user, wherein the changes include an addition of a third user or a deletion of an obsolete second user,
wherein the identity verification module is further configured to:

in response to receiving indication from the familial status change monitoring module of the addition of the third user, receive third data that identifies the third user, verify the identity of the third user based on the third data, wherein the tokenization module is further configured to:

in response to receiving, from the identity verification module, the verified identity of the third user, generate a first updated identity-based NFT that replaces the identity-based NFT, wherein the first updated identity-based NFT is generated based on using, as at least a portion of an input file, (i) the verified identity of the user, (ii) the verified identities of the one or more second users and (iii) the verified identity of the third user, in response to receiving indication from the familial status change monitoring module of the deletion of the obsolete second user, generate a second updated identity-based NFT that replaces the identity-based NFT, wherein the second updated identity-based NFT is generated based on using, as at least a portion of the input file, (i) the verified identity of the user and (ii) the verified identities of the one or more second users excluding the obsolete second user.

2. The system of claim 1, wherein the tokenization module is configured to:

generate the identity-based NFT that includes one or more markers, each marker identifies a familial relationship with a second user and is configured to link the identity-based NFT to another identity-based NFT associated with the respective second user and stored as another block within the distributed ledger.

3. The system of claim 1, wherein the sub-system for generating authentication credentials further comprises:

a life event verification module including fourth instructions that are executable by the at least one second processing device and configured to:

receive fourth data related to one or more life events of the user, verify an occurrence of the one or more life events, wherein the tokenization is further configured to:

generate the identity-based NFT that uses, as at least a portion of the input file, (i) the verified identity of the user, (ii) the verified identities of the one or more second users and (iii) the verified life events of the user.

4. The system of claim 3, wherein the sub-system for generating authentication credentials further comprises a life event monitoring module including fifth instructions that are executable by the at least one second processing device and configured to:

monitor for life events of the user, wherein the identity verification module is further configured to:

in response to receiving indication from the life event monitoring module of a new life event, receive fourth data associated with the new life event, and verify an occurrence of the new life event based on the fifth data, wherein the tokenization module is further configured to:

generate an updated identity-based NFT that replaces the identity-based NFT, wherein the updated identity-based NFT is generated based on using, as at least a portion of an input file, (i) the verified identity of the user, (ii) the verified identities of the one or more second users and (iii) the verified life events including the new life event.

5. The system of claim 1, wherein the sub-system for generating authentication credentials further comprises:

a user preference module including fourth instructions that are executable by the at least one second processing device and configured to:

receive fourth data related to one or more user preferences of the user, verify the one or more user preferences, wherein the tokenization is further configured to:

generate the identity-based NFT that uses, as at least a portion of the input file, (i) the verified identity of the user, (ii) the verified identities of the one or more second users and (iii) verified life events of the user.

6. The system of claim 1, wherein the sub-system for generating authentication credentials further comprises:

an authentication credential application module including fourth instructions that are executable by the at least one second processing device and configured to:

identify one or more online accounts associated with the user, and link the identity-based NFT to the one or more online accounts to allow for the identity-based NFT to be accessed and used as authentication credentials for performing transactions using the one or more or online accounts.

7. The system of claim 1, wherein the identity verification module is further configured to:

verify the identity of the user based on the first data by implementing the at least one distributed trust computing network, wherein the plurality of blocks store the first data and the decentralized nodes of the distributed trust computing network converge on the plurality of blocks to certify the authenticity of the first data.

8. A computer-implemented method for generating Non-Fungible Token (NFT)-based authentication credentials, the computer-implemented method is executed by one or more computer processing devices and comprises receiving first data that identifies a user and second data that identifies one or more second users, wherein the one or more second users have a familial relationship with the user;

verifying an identity of (i) the user based on the first data and (ii) the one or more second users based on the second data;

generating an identity-based Non-Fungible Token (NFT) that uses, as at least a portion of an input file, (i) the verified identity of the user, and (ii) the verified identities of the one or more second users;

storing the identity-based NFT as a block within a distributed ledger stored by decentralized nodes of a distributed trust computing network;

accessing the identity-based NFT from the distributed ledger to authenticate at least one chosen from the group consisting of (i) an identity of the user and (ii) lineage of the user as defined by the one or more second users;

monitoring for changes in familial relationships of the user, wherein the changes include an addition of a third user or a deletion of an obsolete second user, in response to the monitoring indicating the addition of the third user:

receiving third data that identifies the third user, and verifying the identity of the third user based on the third data;

in response to verifying the identity of the third user, generating a first updated identity-based NFT that replaces the identity-based NFT, wherein the first updated identity-based NFT is generated based on using, as at least a portion of an input file, (i) the verified identity of the user, (ii) the verified identities of the one or more second users and (iii) the verified identity of the third user; and in response to the monitoring indicating the deletion of the obsolete second user:
generating a second updated identity-based NFT that replaces the identity-based NFT, wherein the second updated identity-based NFT is generated based on using, as at least a portion of the input file, (i) the verified identity of the user and (ii) the verified identities of the one or more second users excluding the obsolete second user.

9. The computer-implemented method of claim 8, wherein generating the identity-based NFT further comprises generating the identity-based NFT that includes one or more markers, each marker identifies a familial relationship with a respective second user and is configured to link the identity-based NFT to another identity-based NFT associated with the second user and stored as another block within the distributed ledger.

10. The computer-implemented method of claim 8, further comprising:
receiving fourth data related to one or more life events of the user; and
verifying an occurrence of the one or more life events, wherein generating the identity-based NFT further comprises generating the identity-based NFT that uses, as at least a portion of the input file, (i) the verified identity of the user, (ii) the verified identities of the one or more second users and (iii) the verified life events of the user.

11. The computer-implemented method of claim 8, further comprising:
identifying one or more online accounts associated with the user; and
linking the identity-based NFT to the one or more online accounts to allow for the identity-based NFT to be accessed and used as authentication credentials for performing transactions using the one or more or online accounts.

12. A computer program product comprising:
a non-transitory computer-readable medium comprising:
a first set of codes for causing a computer to receive first data that identifies a user and second data that identifies one or more second users, wherein the one or more second users have a familial relationship with the user;
a second set of codes for causing a computer to verify an identity of (i) the user based on the first data and (ii) the one or more second users based on the second data;
a third set of codes for causing a computer to generate an identity-based Non-Fungible Token (NFT) that uses, as at least a portion of an input file, (i) the verified identity of the user, and (ii) the verified identities of the one or more second users;
a fourth set of codes for causing a computer to store the identity-based NFT as a block within a distributed ledger stored by decentralized nodes of a distributed trust computing network;
a fifth set of codes for causing a computer to access the identity-based NFT from the distributed ledger to authenticate at least one chosen from the group consisting of (i) an identity of the user and (ii) lineage of the user as defined by the one or more second users;
a sixth set of codes for causing a computer to monitor for changes in familial relationships of the user, wherein the changes include an addition of a third user or a deletion of an obsolete second user;
a seventh set of codes for causing a computer to, in response to the monitoring indicating the addition of the third user, receive third data that identifies the third user, and verify the identity of the third user based on the third data;
an eighth set of codes for causing a computer to, in response to verifying the identity of the third user, generate a first updated identity-based NFT that replaces the identity-based NFT, wherein the first updated identity-based NFT is generated based on using, as at least a portion of an input file, (i) the verified identity of the user, (ii) the verified identities of the one or more second users and (iii) the verified identity of the third user; and
a ninth set of codes for causing a computer to, in response to the monitoring indicating the deletion of the obsolete second user, generate a second updated identity-based NFT that replaces the identity-based NFT, wherein the second updated identity-based NFT is generated based on using, as at least a portion of the input file, (i) the verified identity of the user and (ii) the verified identities of the one or more second users excluding the obsolete second user.

13. The computer program product of claim 12, wherein the third set of codes are further configured to cause the computer to generate the identity-based NFT that includes one or more markers, each marker identifies a familial relationship with a respective second user and is configured to link the identity-based NFT to another identity-based NFT associated with the second user and stored as another block within the distributed ledger.

14. The computer program product of claim 12, wherein the computer-readable medium further comprises:
a tenth set of codes for causing a computer to receive fourth data related to one or more life events of the user; and
an eleventh set of codes for causing a computer to verify an occurrence of the one or more life events,
wherein the third set of codes are further configured to cause the computer to generate the identity-based NFT identity-based NFT that uses, as at least a portion of the input file, (i) the verified identity of the user, (ii) the verified identities of the one or more second users and (iii) the verified life events of the user.

15. The computer program product of claim 12, wherein the computer-readable medium further comprises:
a tenth set of codes for causing a computer to identify one or more online accounts associated with the user; and
an eleventh set of codes for causing a computer to link the identity-based NFT to the one or more online accounts to allow for the identity-based NFT to be accessed and used as authentication credentials for performing transactions using the one or more or online accounts.

\* \* \* \* \*